US011750459B1

(12) United States Patent
Karri et al.

(10) Patent No.: US 11,750,459 B1
(45) Date of Patent: Sep. 5, 2023

(54) COMPLIANCE CHECKING FOR A MULTI-CLOUD PLATFORM

(71) Applicant: International Business Machines Corporation, Armonk, NY (US)

(72) Inventors: Venkata Vara Prasad Karri, Visakhapatnam (IN); Shikhar Kwatra, San Jose, CA (US); Shailendra Moyal, Pune (IN); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/659,026

(22) Filed: Apr. 13, 2022

(51) Int. Cl.
*H04L 41/0823* (2022.01)
*H04L 41/084* (2022.01)

(52) U.S. Cl.
CPC ........ *H04L 41/0823* (2013.01); *H04L 41/084* (2013.01)

(58) Field of Classification Search
None
See application file for complete search history.

(56) References Cited

U.S. PATENT DOCUMENTS

| | | | |
|---|---|---|---|
| 8,434,129 B2 | 4/2013 | Kannappan et al. | |
| 8,621,550 B1* | 12/2013 | Yehuda | G06F 21/577 713/168 |
| 10,075,429 B2 | 9/2018 | Jayanti Venkata | |
| 10,255,370 B2 | 4/2019 | Carpenter | |
| 10,713,664 B1* | 7/2020 | Alagappan | G06Q 30/018 |
| 10,735,452 B2 | 8/2020 | Thakkar | |
| 2014/0222522 A1* | 8/2014 | Chait | G06Q 10/0637 705/7.36 |
| 2019/0332494 A1 | 10/2019 | Natanzon | |
| 2020/0201614 A1* | 6/2020 | Wang | G06F 16/2365 |

FOREIGN PATENT DOCUMENTS

CN 105164640 B 12/2018

OTHER PUBLICATIONS

"Compliance Manager Templates List", Microsoft Compliance Manager templates list—Microsoft 365 Compliance, Microsoft Docs, Oct. 6, 2021, 13 pgs., <https://docs.microsoft.com/en-us/microsoft-365/compliance/compliance-manager-templates-list?view=o365-woridwide>.

(Continued)

*Primary Examiner* — Mohamed Ibrahim
(74) *Attorney, Agent, or Firm* — David B. Woycechowsky (57) ABSTRACT

Computer technology for helping to ensure various types of compliance for a first user on a multi-cloud platform, the technology including the following operations: (i) receiving an initial version of a compliance template for use with a multi-cloud computer system; (ii) applying corrective ensemble modelling under a recommender and reinforcement framework to dynamically update the compliance template to obtain an updated version of the compliance template; (iii) applying corrective ensemble modelling under a recommender and reinforcement framework to dynamically select a recommended set of compliance tools for the first user; and (iv) validating multi-cloud compliance using the template and tools.

12 Claims, 4 Drawing Sheets

(56) References Cited

OTHER PUBLICATIONS

"Data Security and Protection Policy Template", Netwrix, © 2021 Netwrix Corporation, Downloaded from the Internet on Oct. 6, 2021, 8 pgs., <https://www.netwrix.com/data_security_policy_template.html>.

Durcevic, S., "10 Cloud Computing Risks & Challenges Businesses Are Facing In These Days", Business Intelligence, The Datapine Blog, Jan. 10, 2019, 18 pgs., <https://www.datapine.com/blog/cloud-computing-risks-and-challenges/>.

Holmes, et al., "Model-driven and Domain-specific Architectural Knowledge View for Compliance Meta-data in Process-driven SOAs", SHARK'10, May 2, 2010, 8 pgs., Cape Town, South Africa.

Kerner, S., "Top Cloud Compliance Software Tools", Datamation, Jul. 22, 2019, 9 pgs.,<https://www.datamation.com/cloud-computing/top-cloud-compliance-software-tools.html>.

Singh, et al., "Compliance-based Multi-dimensional Trust Evaluation System for determining trustworthiness of Cloud Service Providers", (Abstract only), Future Generation Computer Systems, vol. 67, Feb. 2017, 5 pgs., <https://doi.org/10.1016/j.future.2016.07.013>.

\* cited by examiner

COMPLIANCE CHECKING FOR A MULTI-CLOUD PLATFORM

BACKGROUND

The present invention relates generally to the fields of multi-cloud computer systems, compliance checks and ensemble modeling. As the term is used herein, a "multi-cloud computer system" is a computer systems typically have access to more than one cloud, regardless of whether the clouds are all of the same type. A hybrid cloud is a type of multi-cloud computer system where a user typically has access to multiple clouds having different types from each other.

The Wikipedia entry for "Ensemble Learning" (as of Jan. 10, 2022) states, in part, as follows: "In statistics and machine learning, ensemble methods use multiple learning algorithms to obtain better predictive performance than could be obtained from any of the constituent learning algorithms alone. Unlike a statistical ensemble in statistical mechanics, which is usually infinite, a machine learning ensemble consists of only a concrete finite set of alternative models, but typically allows for much more flexible structure to exist among those alternatives." (footnote(s) omitted)

SUMMARY

According to an aspect of the present invention, there is a method, computer program product and/or system that performs the following operations (not necessarily in the following order): (i) receiving an initial version of a compliance template for use with a multi-cloud computer system; (ii) applying corrective ensemble modelling under a recommender and reinforcement framework to dynamically update the compliance template to obtain an updated version of the compliance template; and (iii) validating multi-cloud compliance, for a first user of the multi-cloud computer system, using the updated version of the compliance template.

According to an aspect of the present invention, there is a method, computer program product and/or system for use with a first user that uses a multi-cloud computer system that performs the following operations (not necessarily in the following order): (i) applying corrective ensemble modelling under a recommender and reinforcement framework to dynamically select a recommended set of compliance tools for the first user, with the validation of multi-cloud compliance including use of the recommended set of compliance tools; and (ii) validating multi-cloud compliance, for the first user, using the recommended set of compliance tools.

According to an aspect of the present invention, there is a method, computer program product and/or system that performs the following operations (not necessarily in the following order): (i) receiving an initial version of a compliance template for use with a multi-cloud computer system; (ii) applying corrective ensemble modelling under a recommender and reinforcement framework to dynamically update the compliance template to obtain an updated version of the compliance template; (iii) applying corrective ensemble modelling under a recommender and reinforcement framework to dynamically select a recommended set of compliance tools for the first user; and (iv) validating multi-cloud compliance, for a first user of the multi-cloud computer system, using the updated version of the compliance template and the recommended set of compliance tools.

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
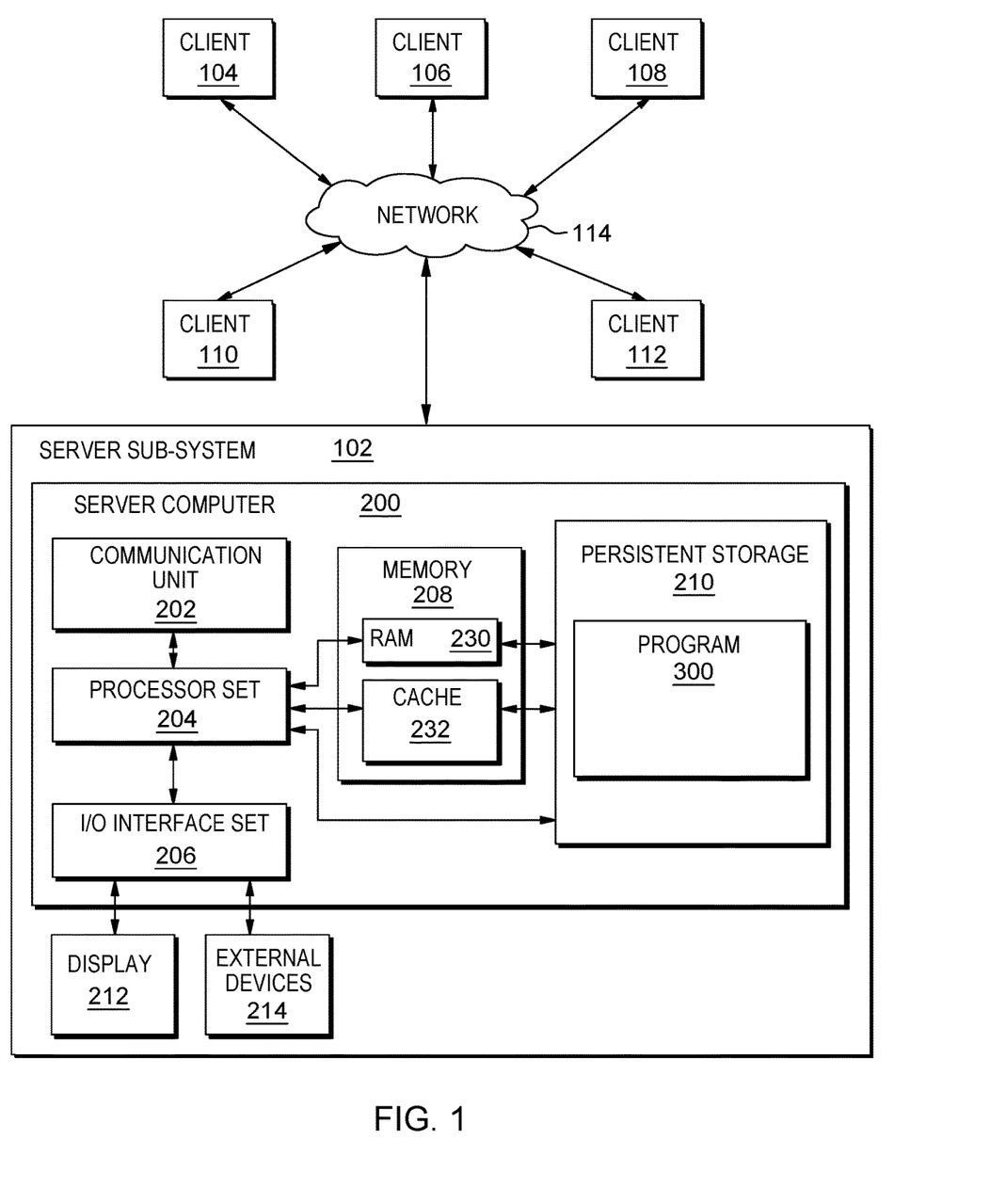
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
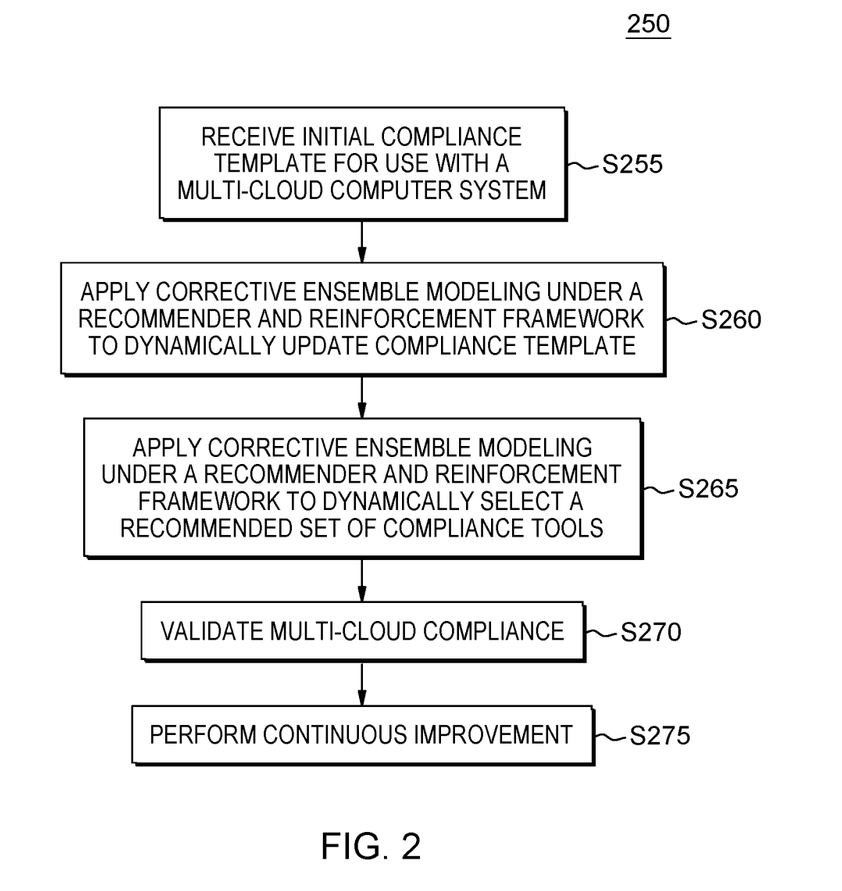
FIG. 2 is a flowchart showing a first embodiment method performed, at least in part, by the first embodiment system.
Figure 3:
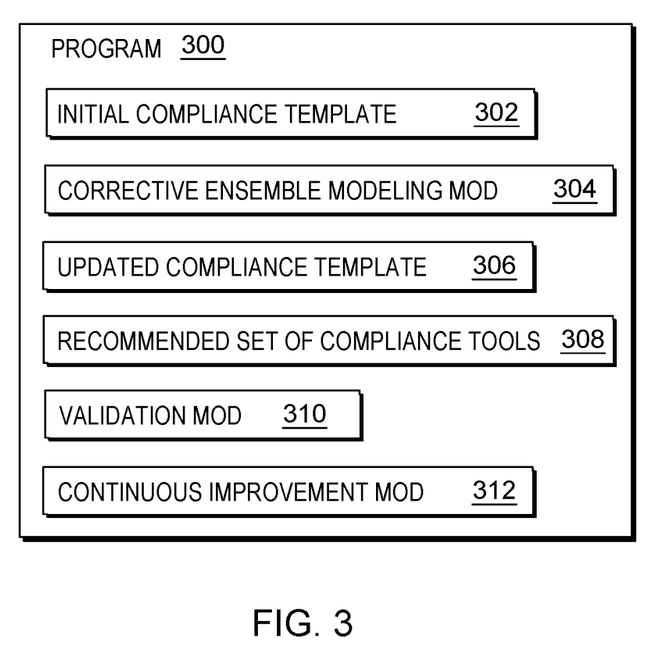
FIG. 3 is a block diagram showing a machine logic (for example, software) portion of the first embodiment system.
Figure 4:
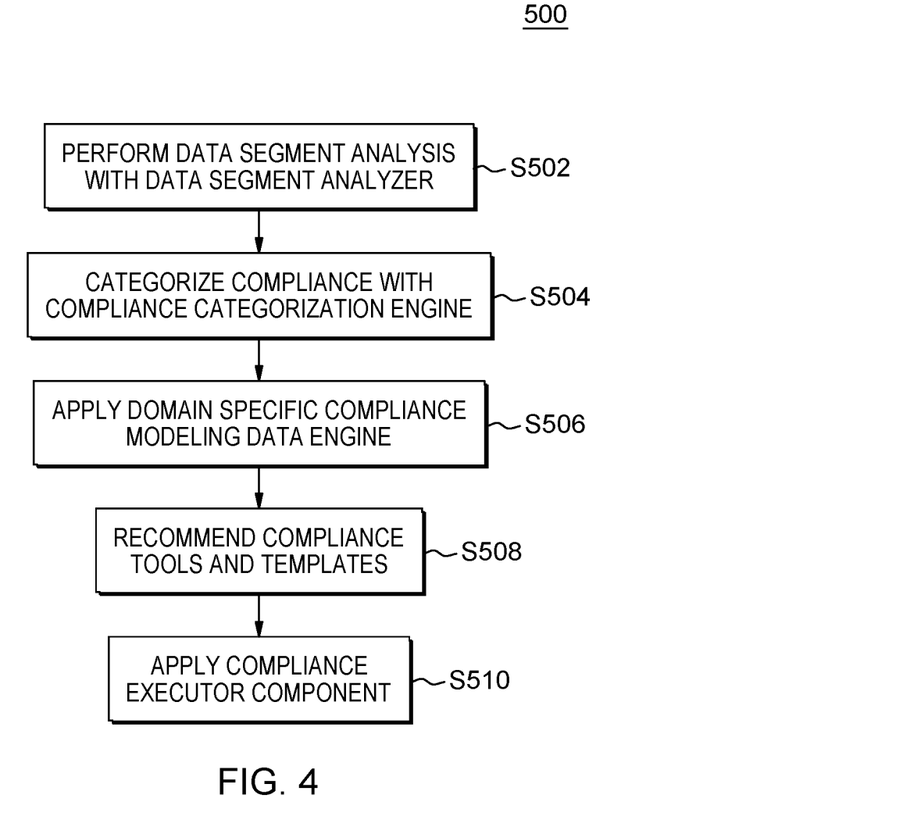
FIG. 4 is a flowchart showing a second embodiment method according to the present invention.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where program 300 receives initial version of a compliance template 302 for use with a multi-cloud computer system (made up of server sub-system 102 and client subsystems 106, 108, 110, which are clouds of the multi-cloud system) by users including a first user (who controlling and using client subsystem 104).

Processing proceeds to operation S260, where corrective ensemble modelling module ("mod") 304 applies corrective ensemble modelling under a recommender and reinforcement framework to dynamically update the compliance template to obtain updated version of the compliance template 306.

Processing proceeds to operation S265, where mod 304 applies corrective ensemble modelling under a recommender and reinforcement framework to dynamically select a recommended set of compliance tools 308 for the first user.

Processing proceeds to operation S270, where validation mod 310, working in conjunction with the first user at client subsystem 104, validates multi-cloud compliance for the first user of the multi-cloud computer system, using the updated version of the compliance template and the recommended set of compliance tools.

Processing proceeds to operation S275, where continuous improvement mod 312 performs continuous improvement by intermittently repeating the following operation: apply corrective ensemble modelling under a recommender and reinforcement framework to dynamically update the compliance template to obtain an updated version of the compliance template and to dynamically re-select an updated recommended set of compliance tools for the first user.

III. Further Comments and/or Embodiments

Some embodiments of the present invention recognize the following facts, potential problems and/or potential areas for improvement with respect to the current state of the art: (i) one of the risks of cloud computing faced today is compliance; (ii) compliance is an issue for anyone using backup services or cloud storage; and/or (iii) every time a company moves data from internal storage to a cloud, it is faced with being compliant with industry regulations and laws (for example, healthcare organizations in the USA (United States of America) have to comply with HIPAA (health insurance portability and accountability act of 1996), public retail companies have to comply with SOX (Sarbanes-Oxley Act of 2002) and PCI DSS (Payment Card Industry Data Security Standard). Similarly, there are laws for food, traffic safety regulations, etc.

Some embodiments of the present invention recognize the following facts, potential problems and/or potential areas for improvement with respect to the current state of the art: (i) depending on the industry and requirements, every organization must ensure these standards are respected and carried out; (ii) the above is one of the many challenges facing cloud computing, and although the procedure can take a certain amount of time, the data must be properly stored; (iii) cloud customers need to look for vendors that can provide compliance, usually third parties, and check if they are regulated by the standards they need; (iv) some vendors offer certified compliance, but in some cases, additional input is needed on both sides to ensure proper compliance regulations, (v) sometimes, governments want the data servers to be hosted in their countries as per their country guidelines only; and/or (vi) security hardening is also done at a code level using configuration files which ensures financial and banking institutions confidently use the cloud applications.

A method according to an embodiment of the present invention includes the following operations (not necessarily in the following order): (i) includes corrective ensemble modeling with recommender and reinforcement framework enabling dynamic nature of the compliance template generation and tool selection; (ii) includes continuous improvement into modeling structure based on domain specific failure analysis; (iii) the generated templates and tool selection are stored in a corpus and is further updated in a timely manner by maintaining the version control based on changing dynamics of geographical policies and domain specific policies with old references; (iv) displaying the updated tool and template set for the already deployed cloud solution admin to opt-in or opt-out or selectively use for a specific part of enterprise application; and (v) using as references for any prospective customer from the same domain and/or geographical site, individually or in combination, by replacing the actual data with prospect system integrated data and accordingly the optimal working model can be generated for the customer to visualize its relevance.

Some embodiments of the present invention may include one, or more, of the following operations, features, characteristics and/or advantages: (i) brings in a unique way to solve the compliance related problem faced by the customers before they can confidently decide to adopt a multi-cloud environment; and/or (ii) is a domain specific multi-cloud compliance using ensemble modeling techniques to make sure that the domain specific solutions adhere to compliance independent of the attributes.

Some embodiments of the present invention may include one, or more, of the following operations, features, characteristics and/or advantages: (i) the system is an ensemble modeling approach-based domain specific multi-cloud compliance validation; (ii) includes corrective ensemble modeling with recommender and reinforcement framework enabling dynamic nature of the compliance template generation and tool selection method and system; (iii) continuous improvement into modeling structure is based on domain specific failure analysis; (iv) generated templates and tool selection are stored in corpus are further updated in a timely manner by maintaining the version control based on changing dynamics of geographical policies and domain specific policies with old references; (v) the system can further display the updated tool and template set for the already deployed cloud solution admin to opt-in or opt-out or selectively use for a specific part of the enterprise application; and/or (vi) the above points can be used as references for any prospective customers from the same domain and/or geographical site, individually or in combination, by replacing the actual data with prospect provided or prospect system integrated data and accordingly the optimal working model can be generated for the customer to visualize its relevance.

Some embodiments of the present invention may include one, or more, of the following operations, features, characteristics and/or advantages: (i) based on the type of data and origin of data tagged as metadata, the data segment(s) will be processed and categorized into different compliance buckets; (ii) categorization of the data is executed using LDA (linear discriminant analysis) by training the series of entities into classification categories; (iii) initially the data is annotated using a knowledge catalog and then using LDA, topic modeling is executed in the backend plugin engine; (iv) the above information points described above are then fed into RFC (request for comments) model to classify the data into different compliance bucket; and/or (v) the above is then put into practice when using search engines online, cross-referencing topics in legal documents, and searching healthcare records by drug and diagnosis.

Some embodiments of the present invention may include one, or more, of the following operations, features, characteristics and/or advantages: (i) once the compliance bucket has been identified, the compliance template is generated with needed compliance standards to be validated; (ii) YAML (yet another markup language) scripts are used to input the variable values in order to generate the template meeting the compliance standard; and/or (iii) additional information regarding the template is predefined by the user based on the category, and the next time, post training period T, the template is generated via a Bi-LSTM (bi-directional long short term memory) model to add the respective template data inputted in the right format.

Some embodiments of the present invention may include one, or more, of the following operations, features, characteristics and/or advantages: (i) identify the storage location and type of storage, such as private cloud, public cloud and location of storage, that is country, region, etc. to define the compliance from the location specific compliance standards; and/or (ii) the above information is then appended, to the above operation, in dictionary format.

Some embodiments of the present invention may include one, or more, of the following operations, features, characteristics and/or advantages: (i) generate the super set of all compliance needed using an ensemble learning model which takes into account the historical data and uses the recommendations for the best compliance tool to achieve the same; (ii) operations described in the paragraphs above are added with data parameters and stored in the json format to be ingested by the Content-Based Filtering recommender system; (iii) previous information is inputted into the cosine similarity model in order to determine the positive or negative correlation; (iv) in case of positive correlation, the model generates the compliance set rules that need to be appended to the super set; and/or (v) in case of negative correlation, the information is removed from the template.

Some embodiments of the present invention may include one, or more, of the following operations, features, characteristics and/or advantages: (i) once the compliance tool is identified, the compliance validation set will be done; (ii) based on the results and further complaints or noncompliance received, using reinforcement learning improves the ensemble model approach to provide the best compliance tool for the future based on available selection criteria; and/or (iii) the failure in the reward function associated with the RL (reinforcement learning) model, that is negative RF (radio-frequency) function will generate a negative feedback into the Bi-LSTM model which feeds into the recommender system to further ameliorate finding the influential fields verses idle fields used in the ensemble model.

According to some embodiments of the present invention, the operations described below is an example for a company that is implementing a solution for a Pharma customer in Germany. The set of rules and regulations with respect to medicines/drugs/people profile, etc., are to be considered and also the German government rules/policies and accordingly implement the solution: (i) with the solution building in place, the system will categorize the data segments based on company rules/regulation, county rules/regulation, with medicines/drugs and people profiles and classify into different categories of the compliance validation based on the compliance and governance data segments; (ii) the system will create the compliance template based on mapping found and the template is dynamic enough to determine if there will be new chemical compound changes created or new drugs are introduced into the pharma companies; (iii) the system will be able to consume the governance and compliance template to identify the best compliance tools using platform data and template match with high relevance; (iv) the system will process the failure scenario and improve the AI (artificial intelligence)) model which generates the compliance template to adapt to the reason with influential fields in the model to have the compliance template and tool identification re-generated to make it more compliant and adhere to governance; (v) the system will be able to accommodate the changes in compliance and governance rules for particular medicine, drugs, chemical compounds, etc.; (vi) have the system available for use by business domains such as banking, infrastructure, retail, Pharma, manufacturing, etc.; and/or (vii) includes polling regional laws and provide updating in a timely manner to automate and ensure deployment is faster and includes client onboards.

As shown in FIG. 5, flow chart 500 represents a compliance checking related method according to the present invention that includes the following operations (with process flow among and between the operations being as shown by the arrows of FIG. 5): S502, S504, S506, S508 and S510.

Some embodiments of the present invention may include one, or more, of the following operations, features, characteristics and/or advantages: (i) includes corrective ensemble modeling with recommender and reinforcement framework enabling dynamic nature of the compliance template generation and tool selection; (ii) includes continuous improvement into modeling structure based on domain specific failure analysis; and/or (iii) discloses specific details in which the present invention determines an ensemble modeling approach-based domain specific multi-cloud compliance validation.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving an initial version of a compliance template including multi-cloud related interactive items relating to a plurality of clouds used in data storage and location(s) where each cloud of the plurality of cloud(s) stores its respective data;
applying corrective ensemble modelling under a recommender and reinforcement framework to dynamically update the multi-cloud related items of the compliance template to obtain an updated version of the compliance template;
validating multi-cloud compliance, for a first user of a multi-cloud computer system, using the updated version of the compliance template with the validation including:
identification of cloud(s) used to store data in the multi-cloud computer system and corresponding location(s) of the cloud(s), and
application of location specific compliance standards to the location(s) of the cloud(s) in the multi-cloud computer system.

2. The CIM of claim 1 further comprising:
performing continuous improvement by intermittently repeating the following operation:
apply corrective ensemble modelling under a recommender and reinforcement framework to dynamically update the compliance template to obtain an updated version of the compliance template.

3. The CIM of claim 2 wherein the performance of continuous improvement is based on domain specific failure analysis.

4. The CIM of claim 1 further comprising:
applying corrective ensemble modelling under a recommender and reinforcement framework to dynamically select a recommended set of compliance tools for the first user based in part upon the location(s) of the cloud(s) used to store the first user's data in the multi-cloud computer system, with the validation of multi-cloud compliance including use of the recommended set of compliance tools.

5. A computer program product (CPP) comprising:
a set of storage device(s); and
computer code stored collectively in the set of storage device(s), with the computer code including data and instructions to cause a processor(s) set to perform at least the following operations:
receiving an initial version of a compliance template including multi-cloud related interactive items relating to a plurality of clouds used in data storage and location(s) where each cloud of the plurality of cloud(s) stores its respective data,
applying corrective ensemble modelling under a recommender and reinforcement framework to dynamically update the multi-cloud related items of the compliance template to obtain an updated version of the compliance template,
validating multi-cloud compliance, for a first user of a multi-cloud computer system, using the updated version of the compliance template with the validation including,
identification of cloud(s) used to store data in the multi-cloud computer system and corresponding location(s) of the cloud(s), and
application of location specific compliance standards to the location(s) of the cloud(s) in the multi-cloud computer system.

6. The CPP of claim 5 wherein the computer code further includes instructions for causing the processor(s) set to perform the following operation(s)::
performing continuous improvement by intermittently repeating the following operation:
apply corrective ensemble modelling under a recommender and reinforcement framework to dynamically update the compliance template to obtain an updated version of the compliance template.

7. The CPP of claim 6 wherein the performance of continuous improvement is based on domain specific failure analysis.

8. The CPP of claim 5 wherein the computer code further includes instructions for causing the processor(s) set to perform the following operation(s)::
applying corrective ensemble modelling under a recommender and reinforcement framework to dynamically select a recommended set of compliance tools for the first user based in part upon the location(s) of the cloud(s) used to store the first user's data in the multi-cloud computer system, with the validation of multi-cloud compliance including use of the recommended set of compliance tools.

9. A computer system (CS) comprising:
a processor(s) set;
a set of storage device(s); and
computer code stored collectively in the set of storage device(s), with the computer code including data and instructions to cause the processor(s) set to perform at least the following operations:
receiving an initial version of a compliance template including multi-cloud related interactive items relating to a plurality of clouds used in data storage and location(s) where each cloud of the plurality of cloud(s) stores its respective data,
applying corrective ensemble modelling under a recommender and reinforcement framework to dynamically update the multi-cloud related items of the compliance template to obtain an updated version of the compliance template,
validating multi-cloud compliance, for a first user of a multi-cloud computer system, using the updated version of the compliance template with the validation including,
identification of cloud(s) used to store data in the multi-cloud computer system and corresponding location(s) of the cloud(s), and
application of location specific compliance standards to the location(s) of the cloud(s) in the multi-cloud computer system.

10. The CS of claim 9 wherein the computer code further includes instructions for causing the processor(s) set to perform the following operation(s):
performing continuous improvement by intermittently repeating the following operation:
apply corrective ensemble modelling under a recommender and reinforcement framework to dynamically update the compliance template to obtain an updated version of the compliance template.

11. The CS of claim 10 wherein the performance of continuous improvement is based on domain specific failure analysis.

12. The CS of claim 9 wherein the computer code further includes instructions for causing the processor(s) set to perform the following operation(s):
applying corrective ensemble modelling under a recommender and reinforcement framework to dynamically select a recommended set of compliance tools for the first user based in part upon the location(s) of the cloud(s) used to store the first user's data in the multi-cloud computer system, with the validation of multi-cloud compliance including use of the recommended set of compliance tools.

* * * * *